United States Patent Office 3,500,407
Patented Mar. 10, 1970

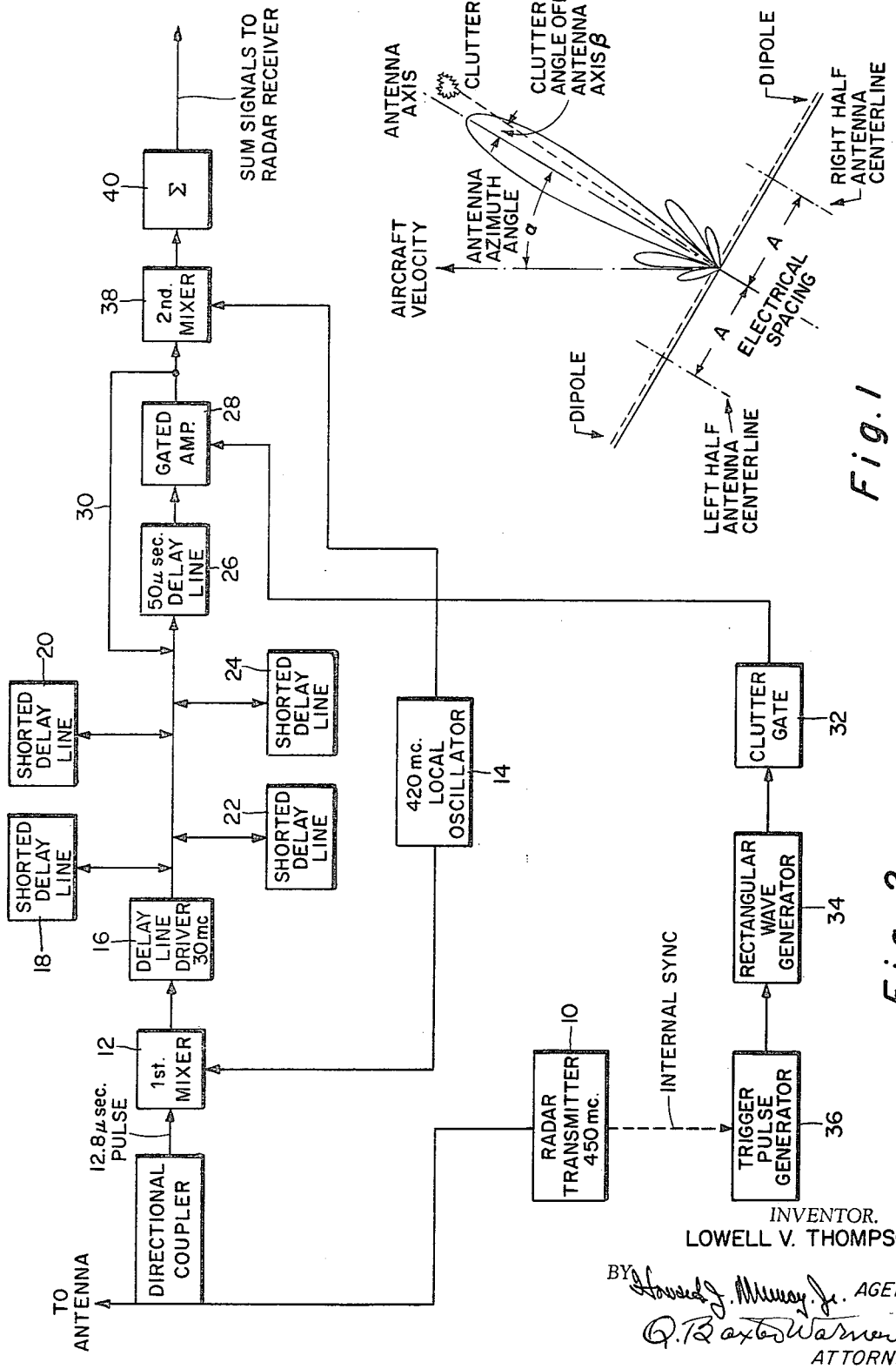

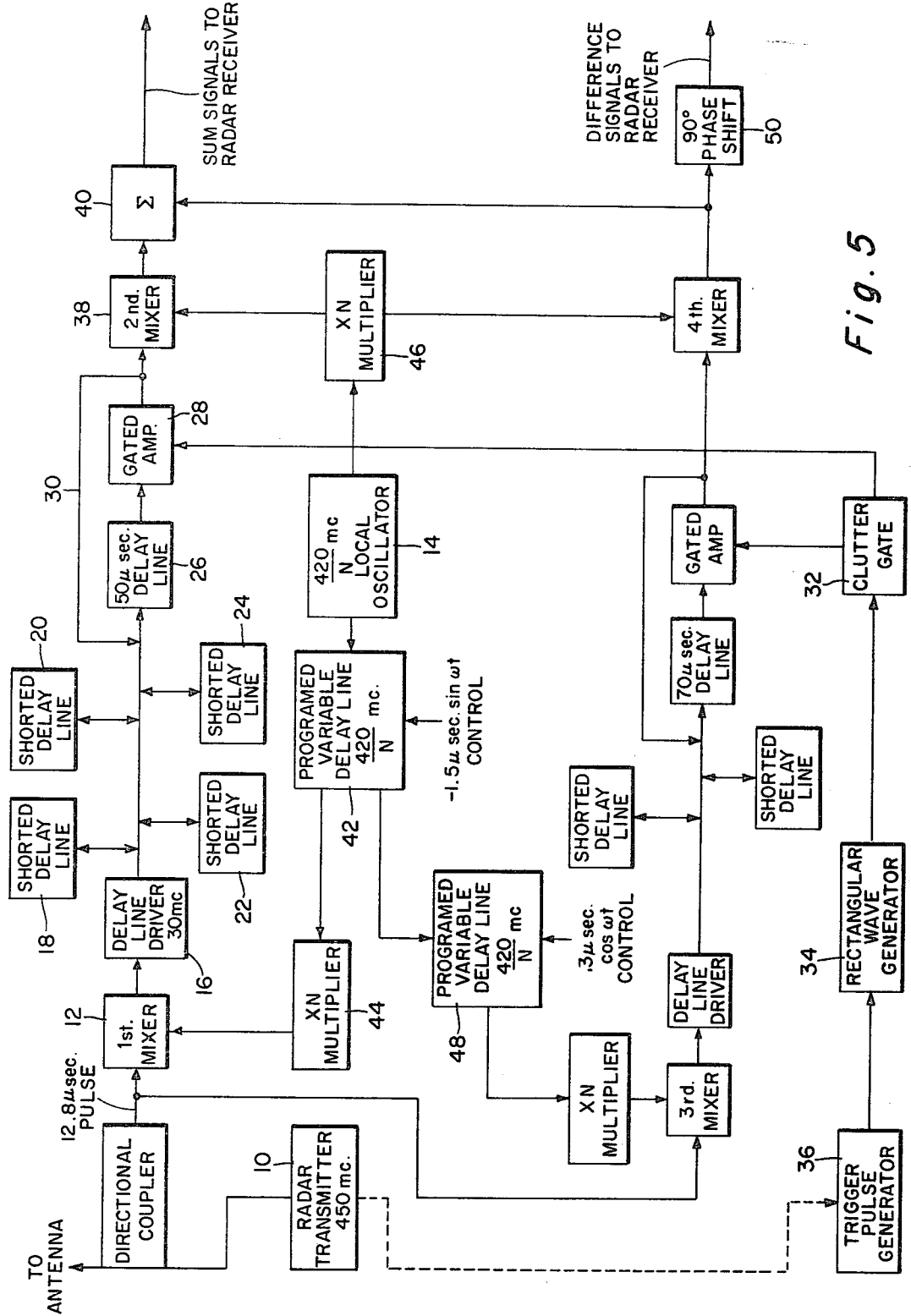

3,500,407
APPARATUS FOR SIMULATING CLUTTER IN TESTING AMTI RADAR SYSTEMS
Lowell V. Thompson, Ventura, Calif., assignor to the United States of America as represented by the Secretary of the Navy
Filed Jan. 20, 1967, Ser. No. 615,039
Int. Cl. G01s 7/40
U.S. Cl. 343—17.7                                    6 Claims

ABSTRACT OF THE DISCLOSURE

The present invention relates to apparatus for testing AMTI (airborne moving target indicator) radar systems of the type employing the co-called "displaced-phase-center-antenna" concept, and which also incorporate pulse expansion and compression techniques together with a clutter-coherent double-delay canceller to reduce the amplitude of the clutter signals without materially reducing the return from moving targets. The wide beam angle utilized in such radar systems creates a problem in the canceller in that clutter signals in the antenna main beam (but off the antenna boresight axis) have Doppler frequencies different from those on the boresight axis. The antenna is consequently electrically divided into two sections so that during operation of the radar the signals from the sections are added together in a sum circuit and substracted from one another in a difference circuit. By adding a discrete fraction of the difference signals to the input of the non-delayed portion of the canceller, and a similar fraction reversed in polarity to the input of the delayed portion, pulse-to-pulse phase shifts can be introduced which compensate for the off-boresight Doppler frequencies of the clutter signals. The present invention simulates the sum and difference signals by employing a pair of variable delay lines which introduces the Doppler frequency, the later simulating the frequency normally generated by movement of the radar platform during operation of the aircraft upon which the radar equipment is installed.

BACKGROUND OF THE INVENTION

The invention pertains to pulse-type radar systems of the type employed as airborne moving target indicators, and more particularly to apparatus for testing and "checking out" such equipment to determine whether it is operating within specifications and with a required degree of accuracy.

The operational requirements of airborne-early-warning detection systems demand a detection of small aircraft targets against a clutter background of land or sea return. To obtain the required detection capability such systems utilize:

(a) Short, effective pulse lengths and narrow beam angles to reduce the clutter area against which the target signals must compete, and;

(b) The Doppler frequency shift of the signal from the moving aircraft target to separate its return from the clutter.

One type of radar which has been developed to meet these requirements utilizes a pulse expansion and compression technique to widen a narrow pulse for transmission and to compress the received signals back to their original form. A system of this nature is discused in a co-pending U.S. Patent application of the present applicant, Ser. No. 569,561 filed July 28, 1966. Such a radar may also use a so-called "clutter-coherent double-delay canceller" to reduce the clutter signals in amplitude by as much as 40 db without materially reducing the return from moving targets. To obtain this 40 db cancellation, a compromise is made in the operating frequency of the system resulting in a relatively wide antenna beam angle. This wide beam angle creates a second order problem in the canceller in that clutter signals in the antenna main beam (but off the antenna boresight axis) can and do have Doppler frequencies different from those on the boresight axis. This results in poor clutter cancellation, particularly at relative angles of 90° and 270° where the spread of the Doppler frequencies is greatest. To compensate for this effect, the "displaced-phase-center-antenna" (DPCA) concept has been developed. In accordance with this concept, during the receive interval of radar operation, the antenna is electrically divided into two sections, with the signals from the sections being added together in a "sum circuit" and subtracted from one another in a "difference" circuit. The difference signals have a null at the antenna boresight axis and are 90° out-of-phase with the sum signals. By adding a discrete fraction of the difference signals to the input of the non-delayed portion of the canceller and a similar fraction reversed in polarity to the input of the delayed portion, pulse-to-pulse phase shifts can be introduced which compensate for the off-boresight Doppler frequencies of the clutter signals.

In testing or checking out a radar system of the above type, considerable difficulty has been experienced in generating the required Doppler frequencies because of the necessity for taking into account the forward movement, or velocity, of the radar platform per se. By employing the concept set forth in the present application, however, these Doppler frequencies may be introduced and also both sum and difference signals provided to the radar receiver.

SUMMARY OF THE INVENTION

The principal objective of the present invention is to synthetically produce a signal suitable for testing the operation of the circuitry of an AMTI radar system of the type described above, and which incorporates the so-called "displaced-phase-center-antenna" concept. In accordance with the teaching of one embodiment of the present disclosure, two types of output signals may be developed. These are:

(1) Expanded pulse clutter signals representative of signals from targets on the antenna axis with (a) Zero Doppler frequency and (b) Variable Doppler with a range equivalent to that produced by speeds of plus or minus the radar platform velocity.

(2) Expanded pulse clutter signals representative of signals with a variable Doppler from targets within the antenna beam but slightly off the antenna axis.

BRIEF DESCRIPTION OF THE DRAWINGS

FIG. 1 of the drawings shows the radiation pattern of an antenna used by a radar of the type to which the present invention is particularly applicable;

FIG. 2 is a block diagram of a circuit designed in accordance with one embodiment of the present invention and designed to produce a synthetic zero-Doppler clutter-coherent signal with expanded pulse characteristics;

FIG. 5 is a block diagram illustrating the manner in which a second programed variable delay line may be added to the system of FIG. 4 to introduce additional Doppler frequencies to simulate targets at additional relative angles.

DESCRIPTION OF THE PREFERRED EMBODIMENTS

Figure 3:
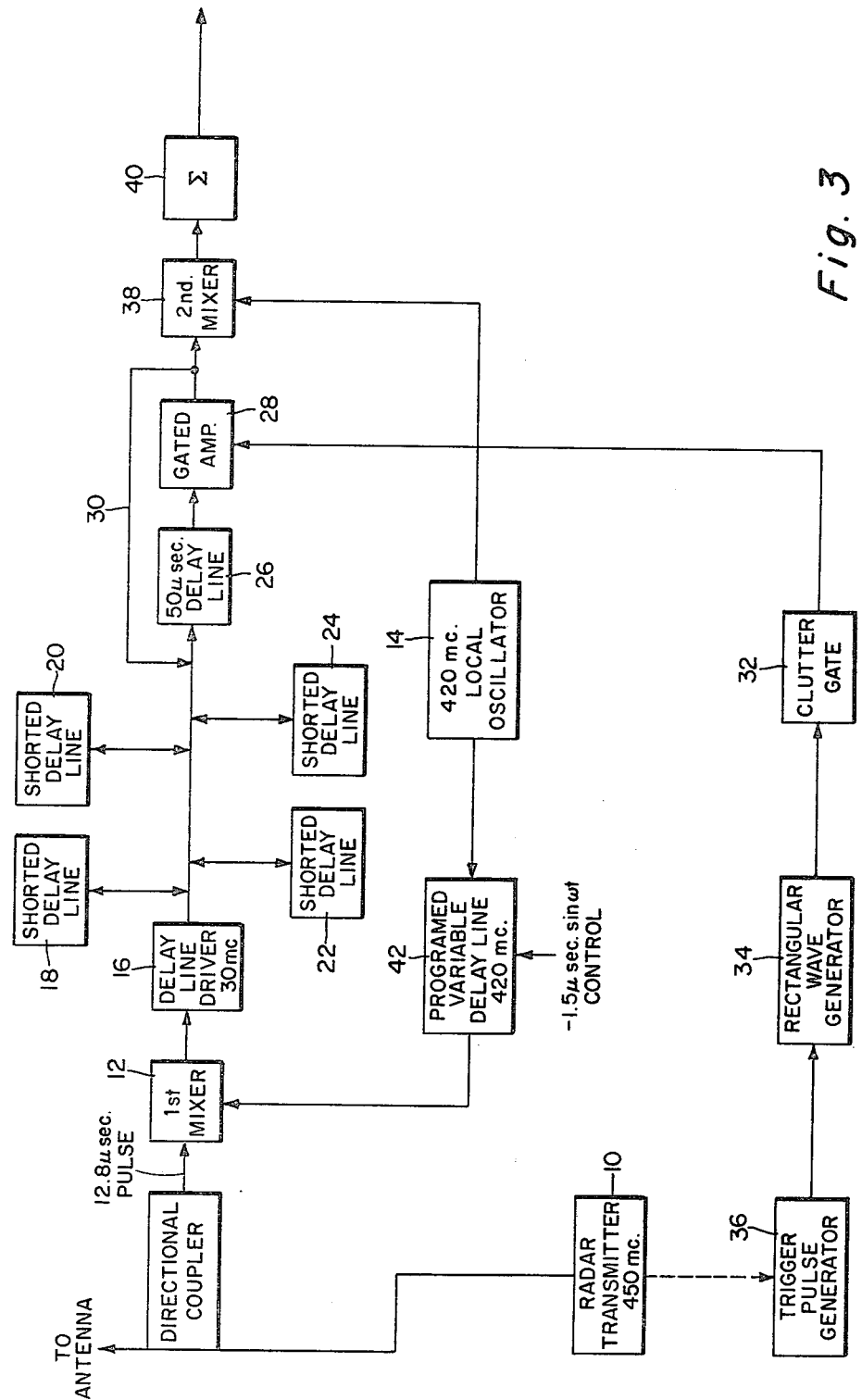
FIG. 3 is a block diagram of a circuit somewhat similar to that shown in FIG. 2 but indicating the manner in which a variable delay line may be inserted between the local oscillator and the first mixer.

Airborne moving target indicator (AMTI) radars designed to be tested by the apparatus of the present invention employ the "intermediate-frequency time-averaged clutter-coherent" principle of operation. In such a system, during the transmitted pulse a phase shift is introduced into the reference oscillator of the receiver to compensate for the pulse-to-pulse phase shift of the clutter signals which is caused by the motion of the aircraft. Since the antenna beam angle is several degrees in width, the off-axis clutter signals (those clutter signals which are within the antenna beam but off the antenna axis) will have various Doppler frequencies and therefore various pulse-to-pulse phase shifts. The displaced-phase-center-antenna (DPCA) introduces phase shifts into the off-axis clutter signals to compensate for the pulse-to-pulse phase shifts caused by the various Doppler frequencies. With proper phase correction, pulse-to-pulse phase shift of all the clutter signals can be minimized, with a resulting improvement in AMTI clutter cancellation.

The method of achieving the required phase correction is to divide the receiving antenna electrically into two halves, as shown in FIG. 1 of the drawings. The signals from the two halves are added together to form a sum signal and subtracted from each other to form a difference signal. Since the two half antennas are of equal size, the half-antenna signals will be equal in magnitude, and the phase angle between the sum signal and the difference signal will be 90°. It should be noted that the difference signal is zero on the antenna axis where no phase correction is required, and is greater for off-axis signals for which phase correction is necessary. Two receiver channels of equal gain and phase shift are used to amplify both the sum and the difference signals, and a fraction of the difference signal is mixed with the sum signal to introduce the desired correcting phase shift.

In testing or checking out a radar system of the nature set forth above, it is necessary to have available a zero-Doppler clutter-coherent signal with expanded pulse characteristics. Such a synthetic signal can be generated by the circuit shown in block diagram in FIGURE 2 of the drawings. In this system, a sample of the 450 megacycle (for example) expanded pulse generated by the radar transmitter 10 is combined in a mixer 12 with the signal from a stable local oscillator 14 operating at 420 megacycles to yield a coherent 30 megacycle test pulse. This test pulse is fed through a driver isolator 16 to a plurality of 30 megacycle delay lines 18, 20, 22 and 24 with various delays ranging from 10 to 20 microseconds. These lines 18 through 24 are intentionally terminated into short circuit loads to cause reflection back to the output of the driver 16. An additional delay line 26 of approximately 50 microseconds is also driven. The output from this line 26 is amplified at 28 to restore the line losses, and then recirculated through the delay line 26 by means of the feedback connection 30. This recirculation is controlled by gating the amplifier 28 off at the end of the desired clutter interval by a signal produced by the clutter gate 32. The operation of the gate 32 is under the control of a rectangular wave developed by the unit 34 in response to pulses supplied thereto from the synchronized generator 36.

The signals from the gated amplifier 28 are mixed at 38 with the output of the local oscillator 14, which restores such signals to the 450 megacycle frequency of the radar transmitter 10. The signals are then applied through the adding circuit 40 to the input to the radar receiver (not shown).

As above brought out, the 30 megacycle delay lines 18 through 24 are intentionally mis-matched at both ends, causing multiple internal reflections and thus multiple outputs to the 50 microsecond delay line 26. These multiple outputs, added to the recirculated signals, will produce phase-coherent clutter-like signals sufficient for the receiver to establish clutter lock. If desired, other types of delay lines which have a plurality of interval discontinuities may be substituted for the lines 18 through 24 as long as they produce the desired multiple reflections.

To introduce a synthetic Doppler frequency to simulate clutter signals on the antenna axis, a variable delay line 42 is inserted between the local oscillator 14 and the first mixer 12 as shown in FIGURE 3 of the drawings. This variable delay line 42 phase-modulates the local oscillator signal to the first mixer 12 and thereby introduces pulse-to-pulse phase shifts in the output signals. The time delay of the unit 42 is programed to vary sinusoidally during the antenna scan interval so as to take into account the radar platform velocity. The required variation in time delay of the unit 42 can be determined by considering that the line must introduce sequential pulse-to-pulse changes in echo interval over the entire antenna scan (which may, for example, be 10 seconds). This required time delay must not only vary sinusoidally with antenna scan, but must decrease when the antenna is pointing forward of the aircraft and increase when the antenna is pointed aft. The delay function at the radar frequency may be expressed as:

$$V_a \left[ \frac{k \frac{2}{\pi} \frac{1}{2w}}{\frac{C}{2}} \right] \sin wt$$

where $V_a$ = velocity of the radar platform (knots)
$w$ = angular rate of antenna scan (r.p.s.)
$C/2$ = velocity of radar propagation (2 ways) (ft./$\mu$sec.)
$\approx 500$ feet per microsecond
$k = 5/3$ = conversion factor knots to ft./sec.

The terms within the bracket reduce to $.5 \times 10^{-2}$ microseconds per knot. Since the sine term varies from $+1$ to $-1$, the total range required is then $10^{-2}$ microseconds per knot. A delay line range of $\pm 1.5$ microseconds variation, for example, will provide for aircraft speeds up to 300 knots. Since the delay is introduced at the local oscillator frequency to obtain the desired range of phase shift, the delay range must be increased by the ratio of transmitter to local oscillator frequencies, that is, 450/420 or 15/14.

Figure 4:
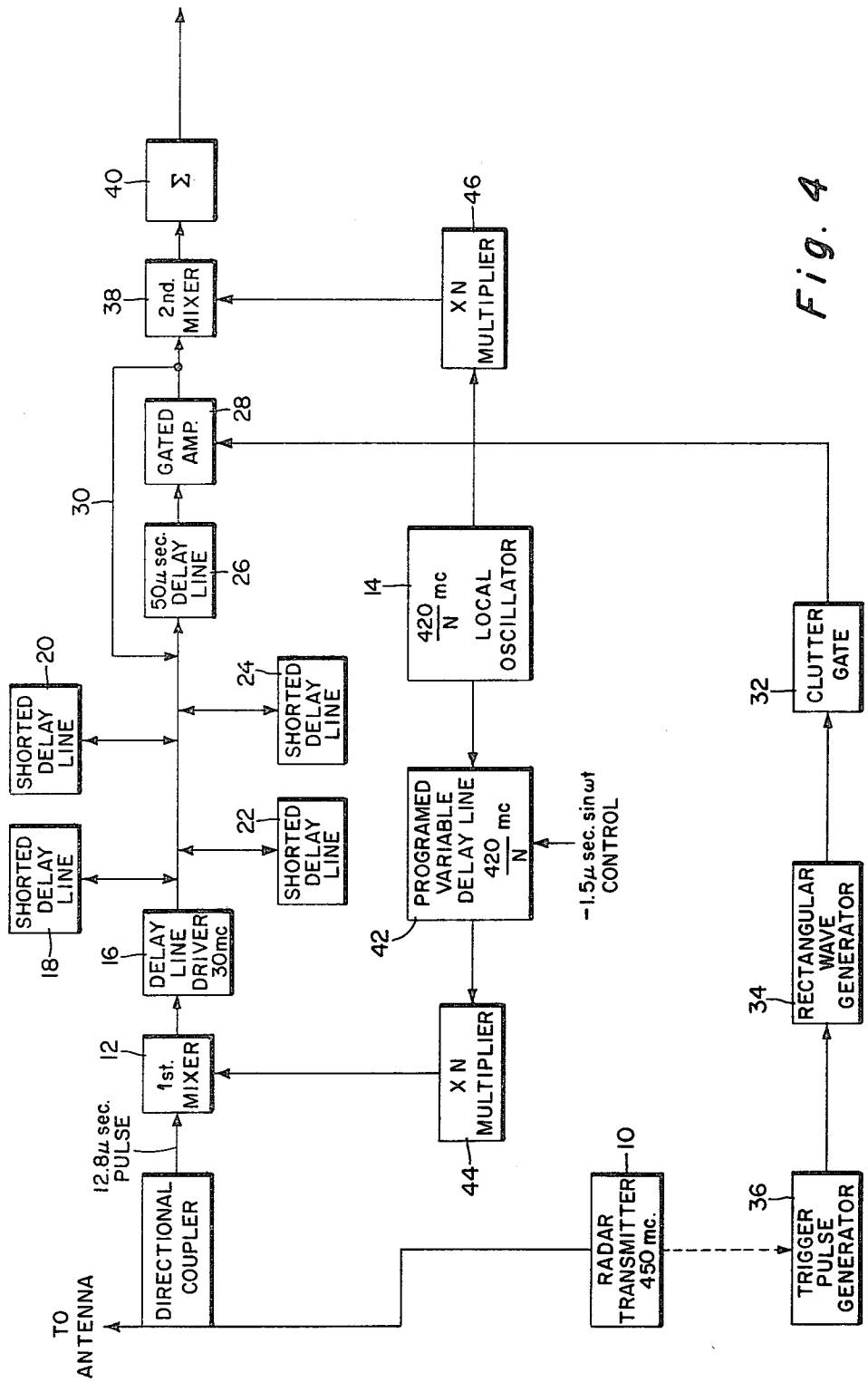
FIG. 4 is a block diagram of a circuit drawn somewhat on the lines of FIG. 3 but indicating the manner in which the local oscillator of FIG. 3 is replaced by an oscillator operating at a lower frequency together with a multiplier arrangement.

The generation of Doppler frequencies by the above method introduces a requirement for a variable delay line which operates at 420 megacycles. A delay line functioning at this frequency is difficult to design, and, to obviate the necessity for employing such a unit, the 420 megacycle local oscillator of FIGURES 2 and 3 may be replaced by a low-frequency local oscillator in combination with frequency multipliers as shown in FIGURE 4 of the drawings. Two frequency multipliers 44 and 46 are respectively employed between the variable delay line 42 and the first mixer 12, on one hand, and between the local oscillator 14 and the second mixer 38, on the other. The multiplication factor N is chosen to shift the local oscillator frequency within the operating range of readily available variable delay lines. The expedient of FIGURE 4 thus simplifies the construction of a system operating in accordance with the principles of the present invention.

To provide for additional Doppler frequency components representative of signals from targets within the antenna beam but not on the antenna boresight axis, an additional recirculating delay line circuit is added to the system as shown in FIGURE 5 of the drawings. This second controlled line (shown in the lower portion of FIGURE 5) is generally similar to the first controlled line described in FIGURE 4, except that this second line has a smaller range than the first and introduces additional Doppler shifts which provide for off-axis clutter signals for one off-axis angle only. As shown in the drawing, the second controlled line includes a further programed variable delay unit 48 which receives a signal from the first programed variable delay line 42 of FIG. 4. The system of FIG. 5 has two distinct outputs, one consisting of sum signals to the radar receiver from the adder 40 of FIGURES 2, 3 and 4, and the other consisting of difference signals from a 90° phase shifter 50. The output from the adder 40 is added to the on-axis signals, while the 90° phase-shifted output of the unit 50 has been gain-adjusted to correspond to the ratio of the sum-to-difference pattern characteristics of the antenna.

To accomplish the above objective, the range of variations of the variable delay line 48 must be established, and this can be achieved by considering that the off-axis clutter signals to be processed fall within ±.2 radians of the antenna axis, and that the resulting pulse-to-pulse phase shifts will be due to the difference of the antenna axis angle and the off-axis angle. These angles may be expressed as:

$$\sin (wt+\phi) - \sin wt$$

where $wt$=antenna pointing angle
$\phi$=angle of clutter off antenna axis

Employing the small angle approximation of $\phi$, the above formula reduces to $\phi \cos wt$ or ±.2 $\cos wt$. The maximum range of the off-axis Doppler delay line will be .2 of the range of the on-axis delay line, and the delay function will be in quadrature with the on-axis delay function.

What is claimed is:

1. In apparatus for testing an airborne-moving target-indicator radar of the type employing a two-section displaced-phase-center-antenna, with signals from each antenna section being added together to establish a "sum" voltage and subtracted from one another to establish a "difference" voltage, the two voltages thus established being applied to the receiver of the radar, the said radar also incorporating a clutter-coherent double-delay canceller to reduce the amplitude of any "clutter" signals that may be present without materially reducing the return from moving targets, a discrete fraction of the said "difference" voltage being added to the input of the non-delayed portion of the said canceller, and a similar fraction, reversed in polarity, being added to the input of the delayed portion of the said canceller, thereby introducing pulse-to-pulse phase shifts which compensate for the off-boresight Doppler frequencies of the "clutter" signals, the improvement which comprises:

means for simulating both the said "sum" and "difference" voltages to thereby provide synthetic Doppler frequencies for application to the receiver of said radar to facilitate testing thereof, such simulating means taking into account the velocity of the radar during flight of the aircraft upon which it is mounted, said simulating means including:

a "summing" circuit incorporating:
a local oscillator;
a first mixer adapted to receive signals from the transmitter of said radar;
a first variable delay line connected between the local oscillator and first mixer of the said "summing" circuit, said first delay line phase-modulating the local oscillator signal to the first summing circuit mixer and thereby introducing pulse-to-pulse phase shifts in the output signals therefrom, the time delay of said first delay line being chosen to vary sinusoidally during the scan interval of said antenna and also to vary in accordance with antenna orientation; and a "difference" circuit including a first mixer adapted to receive signals from the transmitter of said radar connected in generally parallel relationship with said "summing" circuit, said "difference" circuit incorporating:

a second variable delay line connected between the said first variable delay line and the first mixer of the said "difference" circuit, said second variable delay line introducing further pulse-to-pulse phase shifts in the output therefrom to simulate off-axis clutter signals for one off-axis angle only, the time delay of said second delay line being chosen in accordance with the variation between the antenna axis angle and the off-axis angle, and with the off-axis delay function being in quadrature with the on-axis delay function.

2. Apparatus according to claim 1, wherein the time delay of said first delay line is determined in accordance with formula $$V_a \left[ \frac{k \frac{2}{\pi} \frac{1}{2w}}{\frac{C}{2}} \right] \sin wt$$

where $V_a$=velocity of the radar platform (knots)
$w$=angular rate of antenna scan (r.p.s.)=⅒ r.p.s. for AN/APS-111
$C/2$=velocity of radar propagation (2 ways) (ft./μsec.) ≈500 feet per microsecond
$k$=⅝=conversion factor knots to ft./sec.

3. Apparatus in accordance with claim 1, in which said summing circuit includes a second mixer, the output of said local oscillator being fed to said second mixer, and in which a plurality of shorted delay lines are interposed between the first and second mixers of such "summing" circuit, each of said shorted delay lines being intentionally mis-matched to result in multiple internal reflections which effectively simulate the "clutter" signals normally received by said radar, said "summing" circuit also includes an adder to which the outputs of said second mixer and said difference circuit are applied and from which is derived the simulated "sum" voltage.

4. In apparatus for testing an airborne-moving-target-indicator radar of the type employing a two-section displaced-phase-center-antenna, with signals from each antenna section being added together to establish a "sum" voltage and subtracted from one another to establish a "difference" voltage, the two voltages thus established being applied to the receiver of the radar, the said radar also incorporating a clutter-coherent double-delay canceller to reduce the amplitude of any "clutter" signals that may be present without materially reducing the return from moving targets, a discrete fraction of the said "difference" voltage being added to the input of the non-delayed portion of the said canceller, and a similar fraction, reversed in phase, being added to the input of the delayed portion of the said canceller, thereby introducing pulse-to-pulse phase shifts which compensate for the off-boresight Doppler frequencies of the said "clutter" signals, the improvement which comprises:

means for simulating both the said "sum" and "difference" voltages to thereby provide synthetic Doppler frequencies to facilitate testing of the said radar, such simulating means taking into account the velocity of the radar during flight of the aircraft upon which it is mounted, said simulating means including:

a "summing" circuit incorporating:
a directional coupler interposed in the transmission line interconnecting the antenna and transmitter of said radar,
a local oscillator,
a first mixer receiving both the output of said local oscillator and said directional coupler when said radar is in a transmitting status, a delay line driver connected to the output of said first mixer, a first delay line having a predetermined delay interval and receiving the output of said driver, a plurality of further shorted delay lines interposed between said first delay line and said driver, each of such shorted delay lines being intentionally mis-matched so as to produce multiple internal reflections therein, a gated amplifier connected to the output of said first delay line, means for gating said amplifier to simulate the reception of "clutter" signals by said radar, a feedback connection between the output of said gated amplifier and the input of said first delay line, a second mixer connected to the output of said gated amplifier, said second mixer also receiving the output of said local oscillator, and a still further delay line interposed between said local oscillator and said first mixer, such last-mentioned delay line being programmed to have a delay period which varies sinusoidally during the scan interval of the antenna of said radar to thereby phase-modulate the local oscillator output to the said first mixer and thereby introduce pulse-to-pulse phase shifts in the signal output of the said second mixer as applied to the receiver of said radar.

5. Apparatus in accordance with claim 4 in which the said local oscillator has an operating frequency which is reduced by a factor of N, further comprising a pair of frequency multipliers each having a multiplication factor of N, one of said frequency multipliers being connected between said local oscillator and said second mixer and the other of said frequency multipliers being connected between said first mixer and said still further delay line.

6. In apparatus for testing an airborne-moving-target-indicator radar of the type employing a two-section displaced-phase-center-antenna, with signals from each antenna section being added together to establish a "sum" voltage and subtracted from one another to establish a "difference" voltage, the two voltages thus established being applied to the receiver of the radar, the said radar also incorporating a clutter-coherent double-delay canceller to reduce the amplitude of any "clutter" signals that may be present without materially reducing the return from moving targets, a discrete fraction of the said "difference" voltage being added to the input of the non-delayed portion of the said canceller, and a similar fraction, reversed in phase, being added to the input of the delayed portion of the said canceller, thereby introducing pulse-to-pulse phase shifts which compensate for the off-boresight Doppler frequencies of the said "clutter" signals, the improvement which comprises:

means for simulating both the said "sum" and "difference" voltages to thereby provide synthetic Doppler frequencies to facilitate testing of the said radar, such simulating means taking into account the velocity of the radar during flight of the aircraft upon which it is mounted, said simulating means including:

a "summing" circuit incorporating:

a directional coupler interposed in the transmission line interconnecting the antenna and transmitter of said radar, a local oscillator, a first mixer receiving both the output of said local oscillator and said directional coupler when said radar is in a transmitting status, a delay line driver connected to the output of said first mixer, a first delay line having a predetermined delay interval and receiving the output of said driver, a plurality of further shorted delay lines interposed between said first delay line and said driver, each of such shorted delay lines being intentionally mis-matched so as to produce multiple internal reflections therein, a gated amplifier connected to the output of said first delay line, means for gating said amplifier to simulate the reception of "clutter" signals by said radar, a feedback connection between the output of said gated amplifier and the input of said first delay line, and a second mixer connected to the output of said gated amplifier, said second mixer also receiving the output of said local oscillator.

References Cited

UNITED STATES PATENTS 3,365,719  1/1968  Williams _____ 343—17.7

RICHARD A. FARLEY, Primary Examiner

T. H. TUBBESING, Assistant Examiner

U.S. Cl. X.R.

35—10.4